United States Patent
Pal

(10) Patent No.: US 9,798,376 B2
(45) Date of Patent: Oct. 24, 2017

(54) POWER DISTRIBUTION NETWORK (PDN) DROOP/OVERSHOOT MITIGATION

(71) Applicant: QUALCOMM Incorporated, San Digeo, CA (US)

(72) Inventor: Dipti Ranjan Pal, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 14/817,178

(22) Filed: Aug. 3, 2015

(65) Prior Publication Data

US 2017/0038814 A1 Feb. 9, 2017

(51) Int. Cl.
G06F 1/00 (2006.01)
G06F 1/32 (2006.01)
G06F 1/08 (2006.01)

(52) U.S. Cl.
CPC .............. *G06F 1/324* (2013.01); *G06F 1/08* (2013.01); *G06F 1/3237* (2013.01); *G06F 1/3243* (2013.01); *Y02B 60/1217* (2013.01); *Y02B 60/1221* (2013.01); *Y02B 60/1239* (2013.01)

(58) Field of Classification Search
None
See application file for complete search history.

(56) References Cited

U.S. PATENT DOCUMENTS

| | | | |
|---|---|---|---|
| 5,551,044 A * | 8/1996 | Shah | G06F 13/24 710/260 |
| 6,539,049 B1 * | 3/2003 | McDonough | H04B 1/707 375/145 |
| 6,711,447 B1 * | 3/2004 | Saeed | G06F 1/3203 700/82 |
| 8,327,158 B2 | 12/2012 | Titiano et al. | |
| 8,627,128 B2 | 1/2014 | Bieswanger et al. | |
| 2005/0131584 A1 * | 6/2005 | Law | G06F 1/206 700/300 |
| 2005/0144492 A1 | 6/2005 | Yun et al. | |
| 2008/0172565 A1 * | 7/2008 | Chu | G06F 1/26 713/300 |

(Continued)

FOREIGN PATENT DOCUMENTS

EP 2849024 A1 3/2015

OTHER PUBLICATIONS

International Search Report and Written Opinion—PCT/US2016/041001—ISA/EPO—Sep. 28, 2016.

(Continued)

*Primary Examiner* — Nitin Patel
(74) *Attorney, Agent, or Firm* — Loza & Loza, LLP/Qualcomm

(57) ABSTRACT

Systems and methods for power distribution network (PDN) droop/overshoot mitigation are provided. In one embodiment, a method for activating one or more processors comprises reducing a frequency of a clock signal from a first clock frequency to a second clock frequency, wherein the clock signal is output to a plurality of processors including the one or more processors. The method also comprises activating the one or more processors after the frequency of the clock signal is reduced, and increasing the clock signal from the second clock frequency to the first clock frequency after the one or more processors are activated.

19 Claims, 12 Drawing Sheets

(56) References Cited

U.S. PATENT DOCUMENTS

| | | | | |
|---|---|---|---|---|
| 2008/0276026 A1* | 11/2008 | Branover | ................ | G06F 1/324 |
| | | | | 710/260 |
| 2011/0113270 A1* | 5/2011 | Carter | ..................... | G06F 1/324 |
| | | | | 713/320 |
| 2013/0127550 A1* | 5/2013 | Sutardja | ................... | H03K 3/02 |
| | | | | 331/57 |
| 2014/0068299 A1 | 3/2014 | Koinuma et al. | | |
| 2014/0344596 A1* | 11/2014 | Keppel | ................ | G06F 1/3206 |
| | | | | 713/322 |
| 2015/0026398 A1 | 1/2015 | Kim | | |

OTHER PUBLICATIONS

Krishnaswamy V., et al.,"4.3 Fine-grained Adaptive Power Management of the SPARC M7 Processor," 2015 IEEE International Solid-State Circuits Conference—(ISSCC) Digest of Technical Papers, IEEE, Feb. 22, 2015 (Feb. 22, 2015), pp. 74-76, XP032748322, DOI: 10 . 1109/ISSCC.2015.7062932 ISBN: 978-1-4799-6223-5 [retrieved on Mar. 17, 2015].

* cited by examiner

POWER DISTRIBUTION NETWORK (PDN) DROOP/OVERSHOOT MITIGATION

BACKGROUND

Field

Aspects of the present disclosure relate generally to power distribution networks (PDNs), and more particularly, to PDN droop/overshoot mitigation.

Background

A chip may include a power manager that manages power to one or more processors on a chip. For example, the power manager may place a processor on the chip in an idle mode when the processor is not being used to conserve power. When the processor is later needed, the power manager may wake up the processor to place the processor in an active mode.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a processing system is described herein. The processing system comprises a plurality of processors, a clock device configured to generate an input clock signal, and a frequency adjuster configured to receive the input clock signal from the clock device, and to output an output clock signal to the plurality of processors based on the input clock signal. The processing system also comprises a power manager configured to receive a signal to active one or more of the processors, wherein, in response to the signal, the power manager is configured to instruct the frequency adjuster to reduce a frequency of the output clock signal from a first clock frequency to a second clock frequency, to active the one or more of the processors while the frequency of the output clock signal is at the second clock frequency, and to instruct the frequency adjuster to increase the frequency of the output clock signal from the second clock frequency to the first clock frequency after the one or more of the processors are activated.

A second aspect relates to a method for activating one or more processors. The method comprises reducing a frequency of a clock signal from a first clock frequency to a second clock frequency, wherein the clock signal is output to a plurality of processors including the one or more processors. The method also comprises activating the one or more processors after the frequency of the clock signal is reduced, and increasing the clock signal from the second clock frequency to the first clock frequency after the one or more processors are activated.

A third aspect relates to an apparatus for activating one or more processors. The apparatus comprises means for reducing a frequency of a clock signal from a first clock frequency to a second clock frequency, wherein the clock signal is output to a plurality of processors including the one or more processors. The apparatus also comprises means for activating the one or more processors after the frequency of the clock signal is reduced, and means for increasing the clock signal from the second clock frequency to the first clock frequency after the one or more processors are activated.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
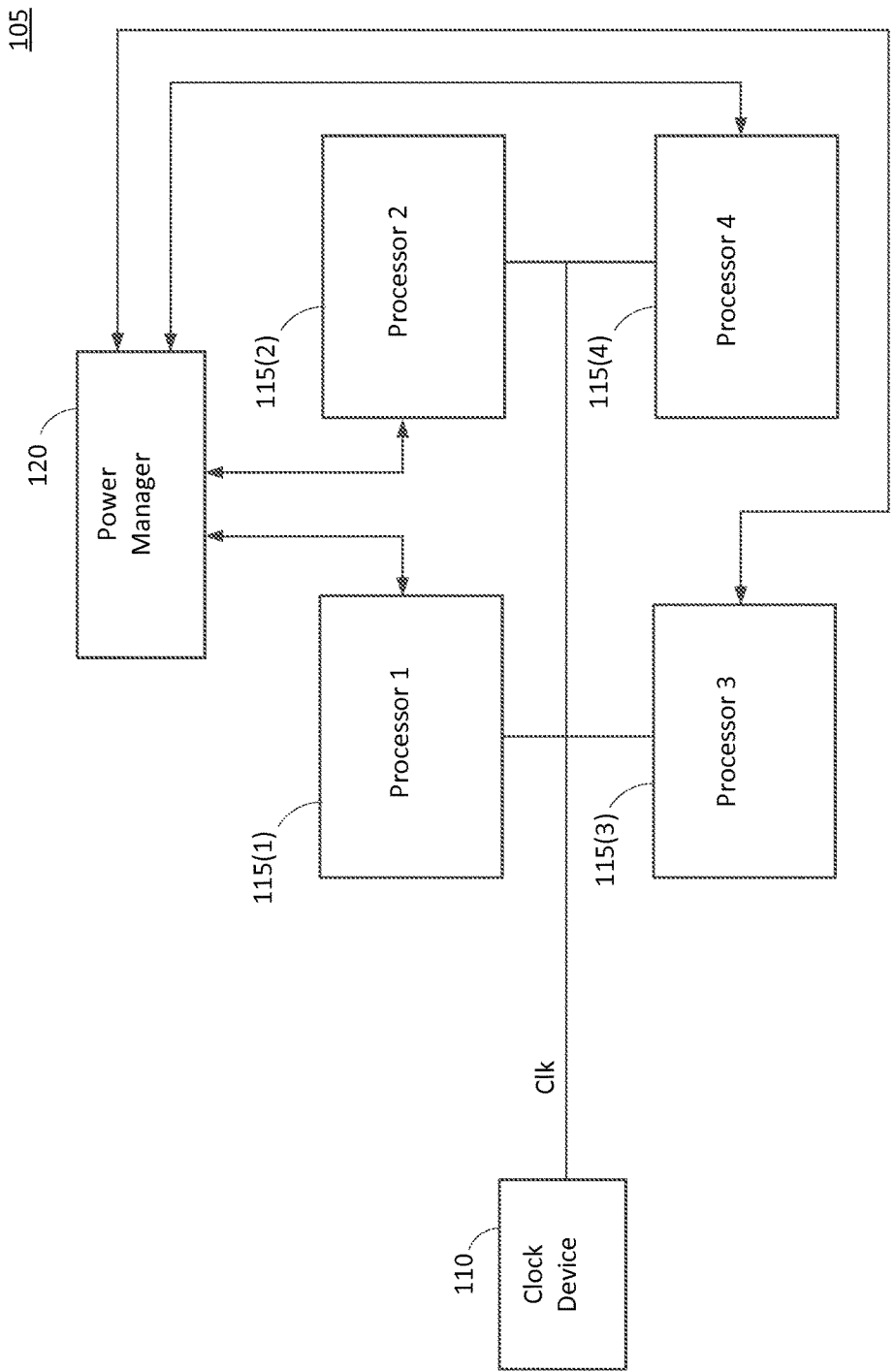
FIG. 1 shows an exemplary multicore processing system with power management.

FIG. 1 shows an example of a multicore processing system 105 (e.g., a quad-core processing system) comprising a first processor 115(1), a second processor 115(2), a third processor 115(3), and a fourth processor 115(4). Each processor may also be referred to as a processor core, a processing unit or other terminology. The processing system 105 also comprises a clock device 110 that generates and outputs a clock signal (denoted "Clk") to the processors 115(1)-115(4). The clock device 110 may comprise, for example, a phase-locked loop (PLL) that generates the clock signal Clk by multiplying the frequency of a reference clock signal (e.g., from a crystal oscillator) by a desired amount. Each processor may use the clock signal Clk for switching logic gates (e.g., transistors) in the processor.

The processors 115(1)-115(4) may receive power from an external power source (not shown) via a PDN (not shown). The external power source may comprise a power management integrated circuit (PMIC) or another source. Other devices (e.g., logic devices, an I/O interface, a modem, a memory, etc.) may also be coupled to the PDN to receive power from the external power source. For example, the processing system 105 may be included in a mobile device that also includes the other devices.

The processing system 105 further comprises a power manager 120 configured to manage power for the processing system 105. In this regard, the power manager 120 may place any one of the processors 115(1)-115(4) in an idle mode (also referred to as a sleep mode) when the processor is not being used to conserve power. When the processor is later needed, the power manager 120 may place the processor in the active mode. At a given time, any number (e.g., zero to all) of the processors 115(1)-115(4) may be in the idle mode. Thus, the power manager 120 manages power of the processing system 105 by managing the idle/active modes of the processors 115(1)-115(4).

When a processor is in the idle mode, internal clock paths of the processor are gated, which prevents the clock signal Clk from propagating to logic gates in the processor via the internal clock paths. This stops switching activity by the logic gates, thereby significantly reducing dynamic power consumption of the processor. When the processor is in the active mode, the internal clock paths are un-gated, allowing the clock signal Clk to propagate to the logic gates in the processor. In the active mode, the processor may fetch, decode and/or execute instructions.

In one example, a processor may send a signal to the power manager 120 requesting the power manager 120 to place the processor in the idle mode. The processor may send the signal, for example, upon executing a wait-for-interrupt (WFI) or wait-for-event (WFE) instruction. The processor may also send the signal when the processor does not have a task currently awaiting execution. In response to the signal, the power manager 120 may transition the processor from the active mode to the idle mode. The power manager 120 may later transition the processor back to the active mode when the power manager 120 receives an interrupt signal or a particular event occurs.

A problem with the processing system 105 in FIG. 1 is that, when a processor transitions from the idle mode to the active mode, the processor may immediately resume switching activity at full clock frequency (i.e., frequency of the clock signal Clk). This can abruptly change the current load on the PDN shared by the processors 115(1)-115(4), causing the supply voltage on the PDN to droop. If the voltage droop is large enough, the voltage droop may cause other processors to malfunction and/or other devices (not shown) coupled to the PDN to malfunction. The voltage droop may be worse if two or more processors transition from the idle mode to the active mode at approximately the same time.

Accordingly, there is a need to mitigate the voltage droop on the PDN caused by activation of one or more processors.

Figure 2:
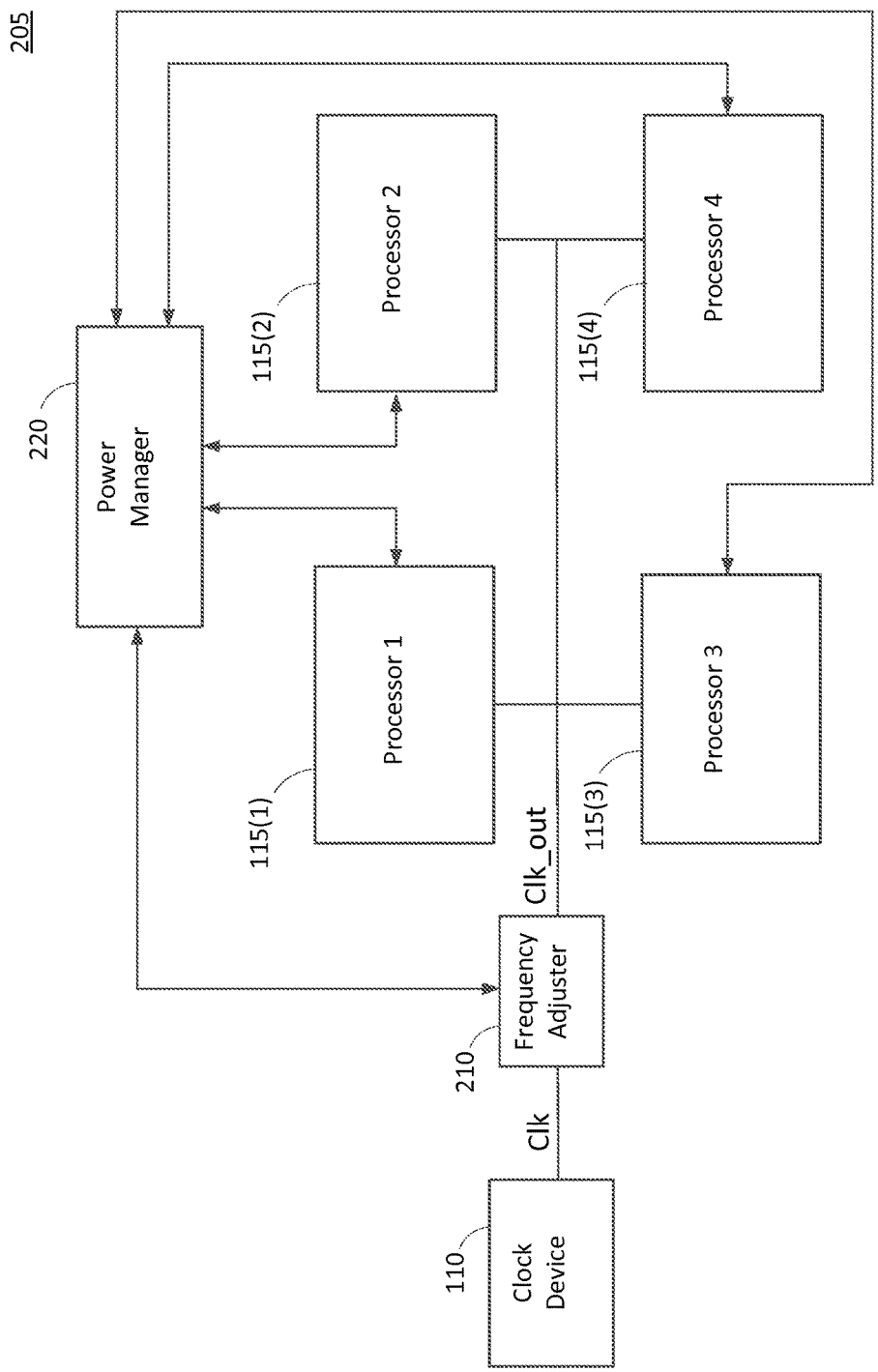
FIG. 2 shows an exemplary multicore processing system with power management according to an embodiment of the present disclosure.

FIG. 2 shows a multicore processing system 205 according to an embodiment of the present disclosure. The processing system 205 further comprises a clock frequency adjuster 210 configured to reduce the frequency of the clock signal Clk by an adjustable amount under the control of the power manager 220. In one example, the clock frequency adjuster 210 may comprise a pulse swallower that reduces the frequency of the clock signal Clk by selectively swallowing pulses of the clock signal Clk. For instance, the pulse swallower may reduce the frequency of the clock signal Clk by 50% by swallowing every other pulse of the clock signal Clk. In another example, the clock frequency adjuster 210 may comprise a frequency divider (e.g., fractional frequency divider) that reduces the frequency of the clock signal Clk by dividing the frequency of the clock signal Clk by an adjustable amount (divisor). For instance, the frequency divider may reduce the frequency of the clock signal Clk by 50% by dividing the frequency of the clock signal Clk by two.

In one embodiment, the power manager 220 may be configured to instruct the frequency adjuster 210 to pass the clock signal Clk when at least one of the processors 115(1)-115(4) is in the active mode and none of the other processors 115(1)-115(4) is in the process of transitioning between the idle mode and the active mode, as discussed further below. In this case, the clock signal (denoted "Clk_out") output by the frequency adjuster 210 to the processors 115(1)-115(4) is the same as the clock signal Clk from the clock device 110.

When one or more of the processors 115(1)-115(4) are to transition from the idle mode to the active mode (e.g., in response to an interrupt signal or an event) and one or more other ones of the processors 115(1)-115(4) are already in the active mode, the power manager 220 may instruct the frequency adjuster 210 to reduce the frequency of the clock signal Clk_out by a predetermined amount. As discussed below, this reduction in the clock frequency reduces the voltage droop on the PDN when the one or more processors are activated.

After the clock frequency is reduced, the power manager 220 un-gates internal clock paths of the one or more processors to activate the one or more processors. This causes logic gates in the one or more processors to begin switching using the clock signal Clk_out. After a period of time has elapsed, the power manager 220 instructs the frequency adjuster 210 to increase the frequency of the clock signal Clk_out back to full clock frequency (i.e., the frequency of clock signal Clk from the clock device 110). The period of time may be based on one or more factors discussed further below.

Thus, the power manager 220 reduces the frequency of the clock signal Clk_out to the processors 115(1)-115(4) prior to activating the one or more processors. After the clock frequency is reduced, the power manager 220 un-gates the internal clock paths of the one or more processors to active the one or more processors. After a period of time has elapsed, the power manager 120 instructs the frequency adjuster 210 to increase the frequency of the clock signal Clk_out back to full clock frequency. The temporary reduction in the clock frequency reduces the rate in change in the current load when the one or more processors are activated. This, in turn, reduces the voltage droop on the PDN when the one or more processors are activated.

Figure 3A:
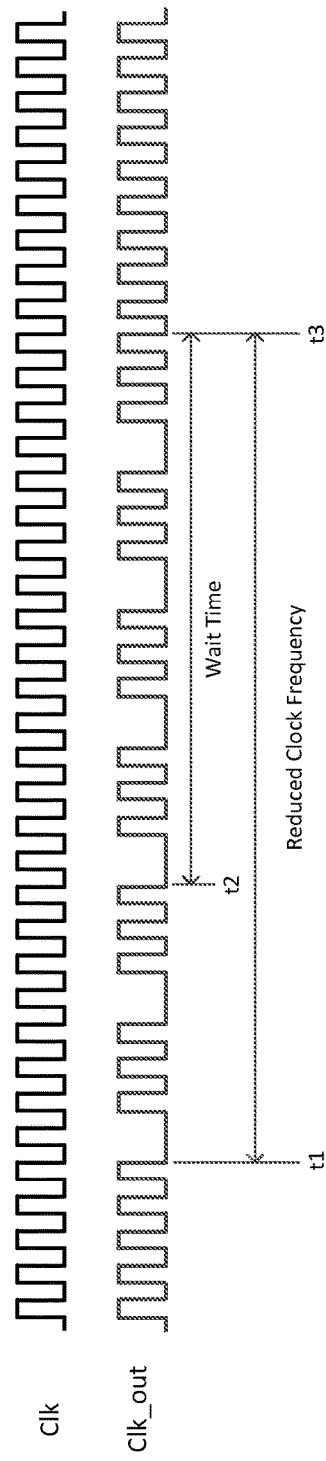
FIG. 3A shows exemplary clock signals during activation of one or more processors according to an embodiment of the present disclosure.

FIG. 3A shows an exemplary timeline of the clock signal Clk from the clock device 110 and the clock signal Clk_out output by the frequency adjuster 210 according to an embodiment of the present disclosure. In this example, one or more of the processors transition from the idle mode to the active mode while one or more of the other processors are already in the active mode. Initially, the clock signal Clk_out is at full clock frequency (i.e., frequency of the clock signal Clk from the clock device 110). At time t1, the power manager 220 instructs the frequency adjuster 210 to reduce the frequency of the clock signal Clk_out by 25% to a frequency equal to approximately 75% of the full clock frequency. The power manager 220 may do this, for example, in response to an interrupt signal or an event, as discussed further below. In the example shown in FIG. 3A, the frequency adjuster 210 reduces the frequency of the clock signal Clk_out to 75% of the full clock frequency by swallowing one out of every four pulses of the clock signal Clk from the clock device 110.

After the frequency is reduced, the power manager 220 un-gates internal clock paths of the one or more processors to activate the one or more processors at time t2. This causes logic gates in the one or more processors to begin switching using the clock signal Clk_out. The power manager 220 waits for a period of time (labeled "Wait Time" in FIG. 3A) before instructing the frequency adjuster 210 at time t3 to increase the frequency of the clock signal Clk_out back to full clock frequency.

Figure 3B:
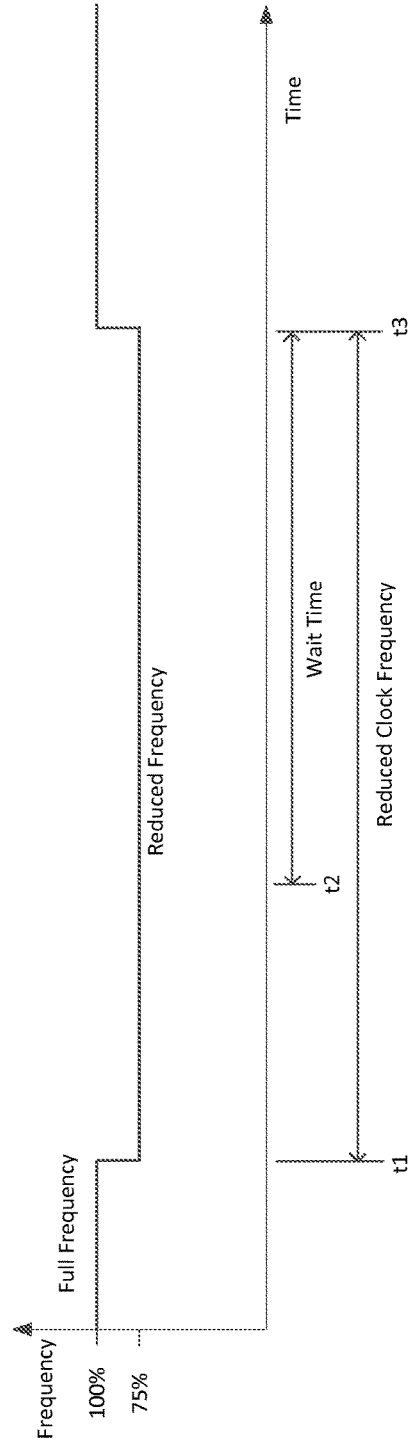
FIG. 3B shows the frequency of one of the clock signals in FIG. 3A over time according to an embodiment of the present disclosure.

FIG. 3B shows the frequency of the clock signal Clk_out as a percentage of full clock frequency for the example in FIG. 3A. As shown in FIG. 3B, the frequency of the clock signal Clk_out is reduced to 75% of the full clock frequency at time t1, which is prior to activation of the one or more processors. After the internal clock paths of the one or more processors are un-gated, the frequency of the clock signal Clk_out is restored back to full clock frequency at time t3.

It is to be appreciated that the wait time in FIG. 3A may span more cycles (periods) of the clock signal Clk than shown in FIG. 3A. Further, although FIG. 3A shows an example in which the frequency of the clock signal Clk_out is reduced using clock pulse swallowing, it is to be appreciated that the frequency of the clock signal Clk_out may also be reduced by dividing the frequency of the clock signal Clk. It is also to be appreciated that the present disclosure is not limited to the example in which the clock signal Clk_out is reduced to 75% of the full clock frequency, and that the frequency of the clock signal Clk_out may be reduced to other percentages of the full clock frequency. For example, the frequency of the clock signal Clk_out may be reduced to a frequency between 20% and 80% of the full clock frequency, or 50% to 80% of the full clock frequency.

In one embodiment, the power manager 220 may reduce the frequency of the clock signal Clk_out by different amounts depending on the number of processors that are to be activated and/or the number of processors that are already in the active mode. For example, the power manager 220 may include a table in memory listing different scenarios, where each scenario corresponds to one or more processors that are to be activated and/or one or more other processors that are already in the active mode. For each scenario, the table may indicate a corresponding reduced frequency (e.g., 75% of the full clock frequency) for the clock signal Clk_out.

In this example, when one or more processors are to be activated, the power manager 220 may determine which scenario in the table applies based on the one or more processors to be activated and/or one or more other processors that are already in the active mode. After determining the applicable scenario, the power manager 220 may look up the corresponding reduced frequency (e.g., 75% of the full clock frequency) in the table, and instruct the frequency adjuster 210 to reduce the frequency of the clock signal Clk_out to the corresponding reduced frequency in the table.

The table may be generated empirically. For example, for each scenario, the voltage droop on the PDN may be measured for different reduced frequencies (e.g., by an external measurement device in a test environment). Each measured voltage droop may then be compared with a voltage droop limit (e.g., an amount of voltage droop that can be tolerated by the processors and/or other devices coupled to the PDN without malfunctioning). In this example, one of the reduced frequencies that results in a voltage droop within the voltage droop limit may be chosen for the scenario, and stored in the table. In one aspect, the largest one of the reduced frequencies that results in a voltage droop within the voltage droop limit may be chosen for the scenario, and stored in the table. This may be done to minimize performance loss when the frequency of the clock signal Clk_out is reduced. Thus, the reduced frequency for each scenario may be determined empirically and stored in the table for later use by the power manager 220.

In one embodiment, when the frequency of the clock signal Clk_out is to be reduced to a reduced frequency, the power manager 220 may instruct the frequency adjuster 210 to ramp down the frequency of the clock signal Clk_out from full clock frequency to the corresponding reduced frequency instead of jumping from full clock frequency to the corresponding reduced frequency. This may be done to mitigate voltage overshoot on the PDN, as discussed further below.

Reducing the frequency of the clock signal Clk_out decreases the current load on the PDN from one or more processors that are in the active mode. The decrease in the current load causes voltage overshoot on the PDN, in which the amount of the overshoot depends on the rate at which the current load decreases with a higher rate generally corresponding to a larger overshoot. By ramping down the frequency of the clock signal Clk, the power manager 220 reduces the rate at which the current load decreases, thereby reducing the overshoot.

Figure 4:
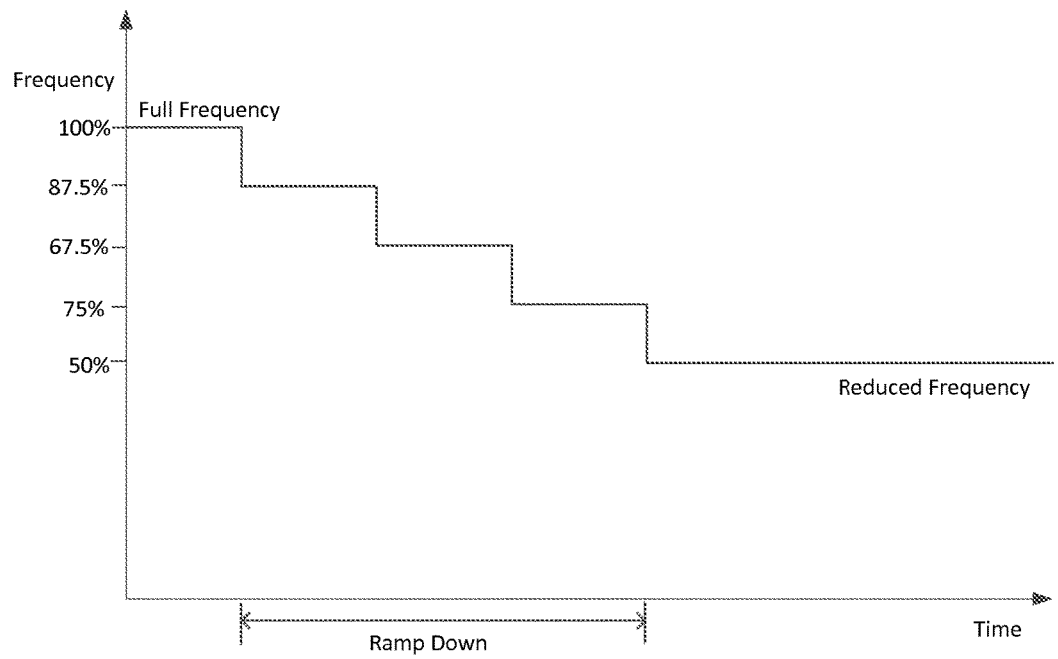
FIG. 4 shows an example of frequency ramp down according to an embodiment of the present disclosure.

In this regard, FIG. 4 shows the frequency of the clock signal Clk_out as a percentage of full clock frequency over time for an example in which the frequency of the clock signal Clk_out is reduced to 50% of the full clock frequency. In this example, the power manager 220 may reduce the clock signal Clk_out when one or more processors are to be activated and one or more other processors are already in the active mode. As shown in FIG. 4, the frequency of the clock signal Clk_out is ramped down in a plurality of steps, in which the frequency of the clock signal Clk_out is reduced to a lower frequency in each subsequent step. The frequency of the clock signal Clk_out is ramped down to 50% of the full clock frequency before the one or more processors in this example are activated.

In the first step, the frequency of the clock signal Clk_out is reduced to 87.5% of the full clock frequency. This may be done, for example, by swallowing one pulse for every eight pulses of the clock signal Clk. In the second step, the frequency of the clock signal Clk_out is reduced to 75% of the full clock frequency. In the third step, the frequency of the clock signal Clk_out is reduced to 67.5% of the full clock frequency. This may be done, for example, by swallowing three pulses for every eight pulses of the clock signal Clk. Finally, in the fourth step, the frequency of the clock signal Clk_out is reduced to 50% of the full clock frequency. The time duration of each step may be predetermined. After the frequency of the clock signal Clk_out is reduced to 50% of the full clock frequency, the power manager 220 may un-gate internal clock paths of the one or more processors to activate the one or more processors.

Thus, the frequency of the clock signal Clk_out is ramped down over a plurality of steps, in which the frequency of the clock signal Clk_out is reduced to a lower frequency in each subsequent step. Although the discussion of FIG. 4 above uses the example of clock pulse swallowing, it is to be appreciated that the present disclosure is not limited to this example. For example, the frequency of the clock signal Clk_out may be ramped down using a frequency divider. In this example, the frequency of the clock signal Clk_out may be ramped down by dividing the frequency of the clock signal Clk by an increasing amount (divisor).

As discussed above, the power manager 220 may include a table in memory listing different scenarios, where each scenario corresponds to one or more processors that are to be activated and/or one or more other processors that are already in the active mode. For each scenario, the table may indicate a corresponding reduced frequency (e.g., 50% of the full clock frequency) for the clock signal Clk_out. For each scenario, the table may also indicate a corresponding ramp down sequence for ramping down the frequency of the clock signal Clk_out from full clock frequency to the corresponding reduced frequency. The ramp down sequence may specify a sequence of intermediate frequencies between full clock frequency and the corresponding reduced frequency, in which the intermediate frequencies may be ordered from highest to lowest.

In this example, when one or more processors are to be activated, the power manager 220 may determine which scenario in the table applies. After determining the applicable scenario, the power manager 220 may look up the corresponding reduced frequency and ramp down sequence in the table. The power manager 220 may then instruct the frequency adjuster 210 to sequentially reduce the frequency of the clock signal Clk_out to each one of the intermediate frequencies in the ramp down sequence in order of highest to lowest. The amount of time spent on each intermediate frequency may be predetermined. After the last intermediate frequency is reached, the power manager 220 may instruct the frequency adjuster 210 to reduce the frequency of the clock signal Clk_out to the corresponding reduced frequency (e.g., 50% of the full clock frequency). The power manager 220 may then activate the one or more processors to be activated under the scenario.

The ramp down sequences for the different scenarios in the table may be generated empirically. For example, for each scenario, the voltage overshoot on the PDN may be measured for different ramp down sequences. Each measured voltage overshoot may then be compared with a voltage overshoot limit (e.g., an amount of voltage overshoot that can be tolerated by the processors and/or other devices coupled to the PDN without malfunctioning). In this example, one of the ramp down sequences that results in a voltage overshoot within the voltage overshoot limit may be chosen for the scenario, and stored in the table.

In one embodiment, when the frequency of the clock signal Clk_out is restored back to full clock frequency after activation of one or more processors, the power manager 220 may instruct the frequency adjuster 210 to ramp up the frequency of the clock signal Clk_out from the corresponding reduced frequency to full clock frequency instead of jumping from the corresponding reduced frequency to full clock frequency. This may be done to mitigate voltage droop on the PDN, as discussed further below.

Increasing the frequency of the clock signal Clk_out increases the current load on the PDN from one or more active processors. The increase in the current load causes voltage droop on the PDN, in which the amount of the droop depends on the rate at which the current load increases with a higher rate generally corresponding to a larger droop. By ramping up the frequency of the clock signal Clk, the power manager 220 reduces the rate at which the current load increases, thereby reducing the droop.

Figure 5:
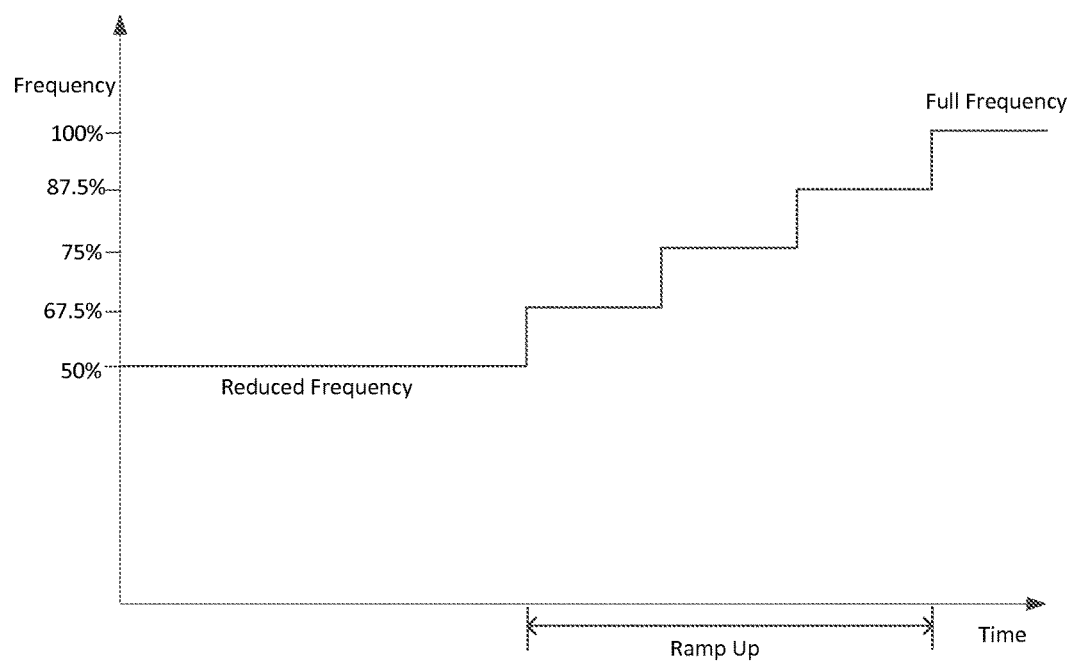
FIG. 5 shows an example of frequency ramp up according to an embodiment of the present disclosure.

In this regard, FIG. 5 shows the frequency of the clock signal Clk_out as a percentage of full clock frequency over time for an example in which the frequency of the clock signal Clk_out is increased from 50% of full clock frequency to full clock frequency. In this example, the power manager 220 may increase the frequency of the clock signal Clk_out to restore full clock frequency after one or more processors have been activated. As shown in FIG. 5, the frequency of the clock signal Clk_out is ramped up in a plurality of steps, in which the frequency of the clock signal Clk_out is increased to a higher frequency in each subsequent step. The frequency of the clock signal Clk_out may be ramped up after the one or more processors in this example have been activated.

In the first step, the frequency of the clock signal Clk_out is increased to 67.5% of the full clock frequency. In the second step, the frequency of the clock signal Clk_out is increased to 75% of the full clock frequency. In the third step, the frequency of the clock signal Clk_out is increased to 87.5% of the full clock frequency. Finally, in the fourth step, the frequency of the clock signal Clk_out is increased to full clock frequency, thereby restoring full clock frequency to the processors. The time duration of each step may be predetermined.

Thus, the frequency of the clock signal Clk_out is ramped up over a plurality of steps, in which the frequency of the clock signal Clk_out is increased to a higher frequency in each subsequent step. In one example, the frequency of the clock signal Clk_out may be ramped up using a clock swallower. In this example, the frequency of the clock signal Clk_out is ramped up by swallowing a decreasing percentage of the clock pulses. In another example, the frequency of the clock signal Clk_out may be ramped up using a frequency divider. In this example, the frequency of the clock signal Clk_out is ramped up by dividing the frequency of the clock signal Clk by a decreasing amount (divisor).

As discussed above, the power manager 220 may include a table in memory listing different scenarios, where each scenario corresponds to one or more processors that are to be activated and/or one or more other processors that are already in the active mode. For each scenario, the table may indicate a corresponding reduced frequency (e.g., 50% of the full clock frequency) for the clock signal Clk_out and/or ramp down sequence. For each scenario, the table may also indicate a corresponding ramp up sequence for ramping up the frequency of the clock signal Clk_out back to full clock frequency after activation of the one or more processors under the scenario. The ramp up sequence may specify a sequence of intermediate frequencies between the corresponding reduced frequency and full clock frequency, in which the intermediate frequencies may be ordered from lowest to highest.

In this example, when one or more processors are to be activated, the power manager 220 may determine which scenario in the table applies. After determining the applicable scenario, the power manager 220 may look up the corresponding reduced frequency, and ramp up sequence in the table. The power manager 220 may then reduce the frequency of the clock signal Clk_out to the corresponding reduced frequency. This may involve ramping down the frequency of the clock signal Clk_out, as discussed above. After the frequency of the clock signal Clk_out is reduced, the power manager 220 may activate the one or more processors to be activated under the scenario. After the one or more processors are activated, the power manager 220 may instruct the frequency adjuster 210 to sequentially increase the frequency of the clock signal Clk_out to each one of the intermediate frequencies in the ramp up sequence in order of lowest to highest. The amount of time spent on each intermediate frequency may be predetermined. After the last intermediate frequency is reached, the power manager 220 may instruct the frequency adjuster 210 to increase the frequency of the clock signal Clk_out to full clock frequency.

The ramp up sequences for the different scenarios in the table may be generated empirically. For example, for each scenario, the voltage droop on the PDN may be measured for different ramp up sequences. Each measured voltage droop may then be compared with the voltage droop limit. In this example, one of the ramp up sequences that results in a voltage droop within the voltage droop limit may be chosen for the scenario, and stored in the table.

Figure 6:
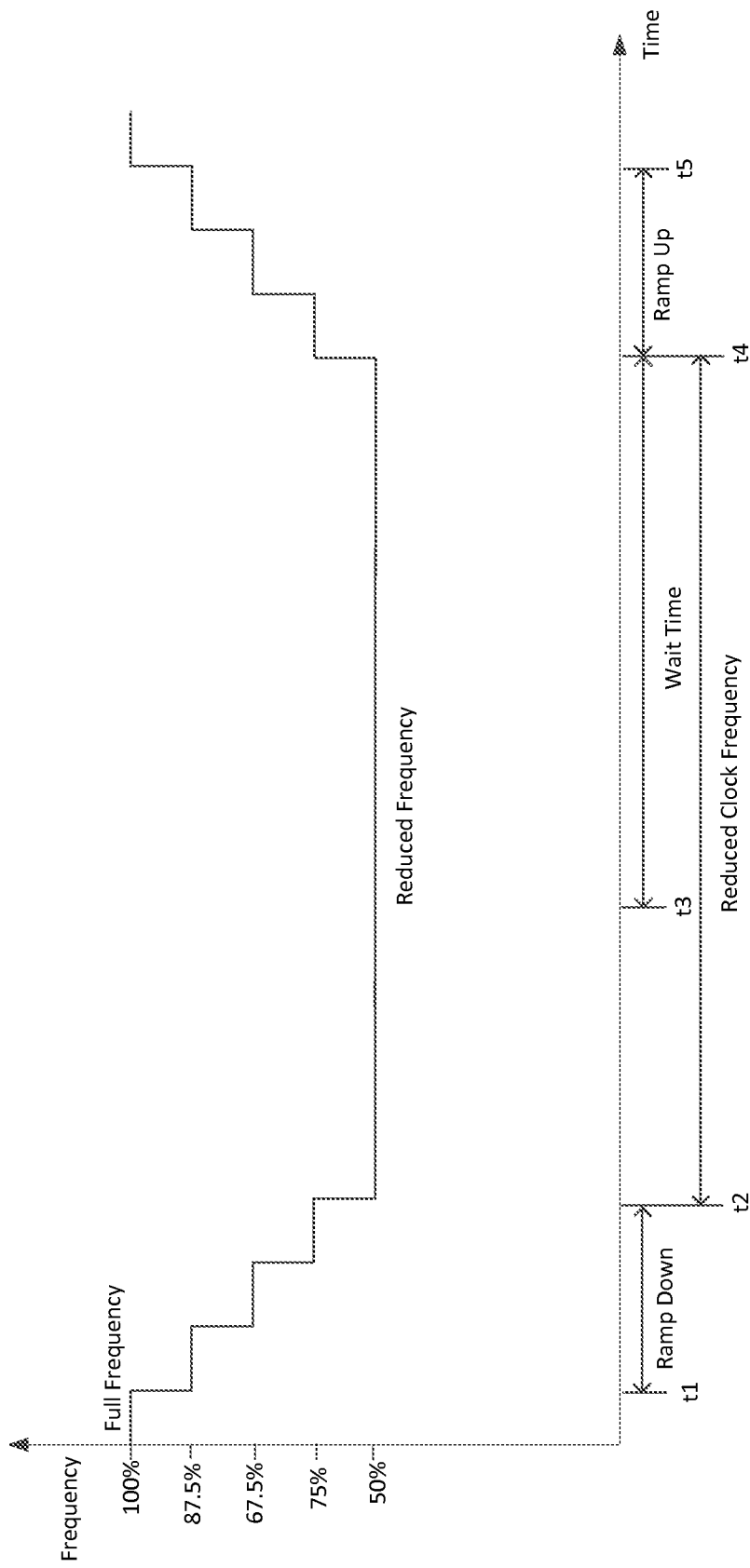
FIG. 6 shows an example of frequency ramp down and frequency ramp up according to an embodiment of the present disclosure.

FIG. 6 shows the frequency of the clock signal Clk_out as a percentage of full clock frequency over time for an example in which one or more processors are activated (e.g., in response to an interrupt signal or event) and one or more other processors are already in the active mode. Initially, the clock signal Clk_out to the processors is at full clock frequency (i.e., frequency of the clock signal Clk from the clock device 110). At time t1, the power manager 220 instructs the frequency adjuster 210 to ramp down the frequency of the clock signal Clk_out to a reduced frequency equal to 50% of the full frequency. At time t2, the frequency of the clock signal Clk_out reaches the reduced frequency. The power manager 220 then un-gates internal clock paths of the one or more processors to active the one or more processors at time t3. After a wait period (labeled "Wait Time" in FIG. 6), the power manager 220 instructs the frequency adjuster 210 to ramp up the frequency of the clock signal Clk_out back to full clock frequency at time t4. At time t5, the frequency of the clock signal Clk_out is restored to full frequency. It is to be appreciated that the frequency of the clock signal Clk_out may be reduced to other frequencies besides 50% of the full clock frequency, and is therefore not limited to the example of 50% of the full clock frequency.

As discussed above, after un-gating the internal clock paths of one or more processors, the power manager 220 may wait for a wait period before increasing the frequency of the clock signal Clk_out back to full clock frequency. In one example, the wait period may depend on a voltage settling time for the PDN after the internal clock paths of the one or more processors are un-gated, as discussed below.

Un-gating the internal clock paths of the one or more processors causes a voltage droop on the PDN due to an increase in the current load on the PDN from the one or more processors. This voltage droop is reduced by reducing the frequency of the clock signal Clk_out prior to un-gating the internal clock paths of the one or more processors, as discussed above. After the voltage droop, the voltage of the PDN gradually settles to a voltage approximately equal to the nominal supply voltage of the PDN. In this example, the wait time may be determined by a time it takes for the voltage of the PDN to settle within a certain range (e.g., within 5% or less) of the nominal supply voltage of the PDN. The settling time may be determined empirically, as discussed further below.

As discussed above, the power manager 220 may include a table in memory listing different scenarios, where each scenario corresponds to one or more processors that are to be activated and/or one or more other processors that are already in the active mode. For each scenario, the table may include a corresponding reduced frequency and a corresponding wait time. In this example, when one or more processors are to be activated, the power manager 220 may determine which scenario in the table applies. After determining the applicable scenario, the power manager 220 may look up the corresponding reduced frequency and corresponding wait time in the table. The power manager 220 may then reduce the frequency of the clock signal Clk_out to the corresponding reduced frequency. After the frequency of the clock signal Clk_out is reduced, the power manager 220 may un-gate the internal clock paths of the one or more processors to be activated under the scenario. After the clock paths are un-gated, the power manager 220 wait for the corresponding wait time before increasing the frequency of the clock signal Clk_out back to full clock frequency. In this example, the power manager 220 may use a timer to determine when the wait time has elapsed.

The wait times for the different scenarios in the table may be generated empirically. For example, for each scenario, the voltage waveform of the PDN may be measured when the internal clock paths of the one or more processors to be activated under the scenario are un-gated. The voltage waveform may then be analyzed to determine a time at which the voltage of the PDN settles to within a certain range of the nominal supply voltage of the PDN. The determined time (settling time) may be used to determine the wait time for the scenario, and the determined wait time may be stored in the table for later use by the power manager 220.

As discussed above, the power manager 220 may place one of the processors 115(1)-115(4) in the idle mode when the processor executes a wait-for-interrupt (WFI) instruction, a wait-for-event (WFE) instruction, or another instruction indicating that the processor is to be placed in the idle mode. Upon executing the instruction, the processor may signal to the power manager 220 to place the processor in the idle mode. After the processor is placed in the idle mode, the power manager 220 may transition the processor back to the active mode when the power manager 220 receives an interrupt signal or a certain event occurs. The interrupt signal may come from a device (e.g., peripheral device) that needs the processor (e.g., for processing data).

Figure 7:
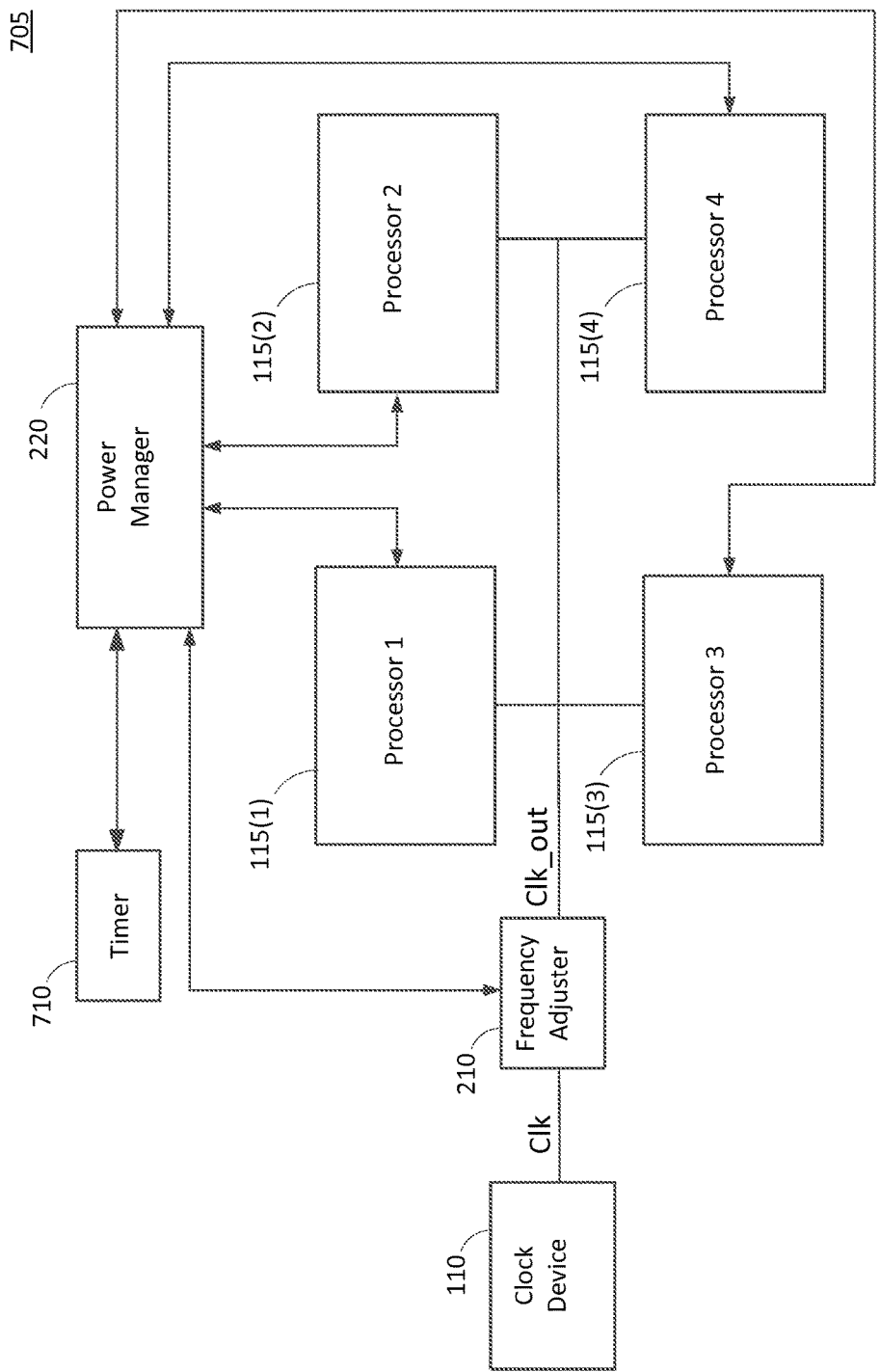
FIG. 7 shows an example of a timer coupled to a power manager according to an embodiment of the present disclosure.

In another example, the interrupt signal may come from a timer. In this regard, FIG. 7 shows an example in which the processing system 705 includes a timer 710 coupled to the power manager 220. In this example, in response to receiving a signal to place the processor in the idle mode, the power manager 220 may trigger the timer 710. After being triggered, the timer 710 may send the interrupt signal to the power manager 220 after a predetermined period of time has elapsed. The timer 710 may keep track of time using an internal counter or another circuit. In response to the interrupt signal from the timer 710, the power manager 220 may activate the processor, as discussed above.

The power manager 220 may program the predetermined period of time into the timer 710. The predetermined period of time may be based on an estimate of the amount of time until the processor is needed again. For example, the processor may be used to process data in time frames. In this example, the processor may finish processing data for a current time frame before data for the next time frame is received. In this case, when the processor is finished processing the data for the current time frame, the processor may signal to the power manager 220 to place the processor in the idle mode. In response, the power manager 220 may place the processor in the idle mode to conserve power. The power manager 220 may also determine an amount of time until the start of the next time frame, and program the timer 710 according to the determined amount of time so that the timer 710 sends the interrupt signal just before the start of the next frame. Alternatively, the processor may determine the amount of time until the next frame and send the determined amount of time to the power manager 220 to program the timer 710 accordingly.

In another example, the power manager 220 may transition the processor back to the active mode when a certain event occurs. In this example, when the event occurs, the power manager 220 may receive an event signal from a device (e.g., peripheral device) indicating that the event has occurred. In response to the event signal, the power manager 220 may activate the processor, as discussed above.

The event may be a need by a device (e.g., peripheral device) to use the processor. In this example, when the device needs to use the processor (e.g., for data processing), the device may send an event signal to the power manager 220 to activate the processor. The device (e.g., camera) may send the event signal to the power manager 220 shortly after being activated and/or connected to a mobile device (e.g., smart phone) comprising the processing system 205 or 705. It is to be appreciated that the device may also send an event signal to activate two or more processors if the device needs more than one processor.

Figure 8:
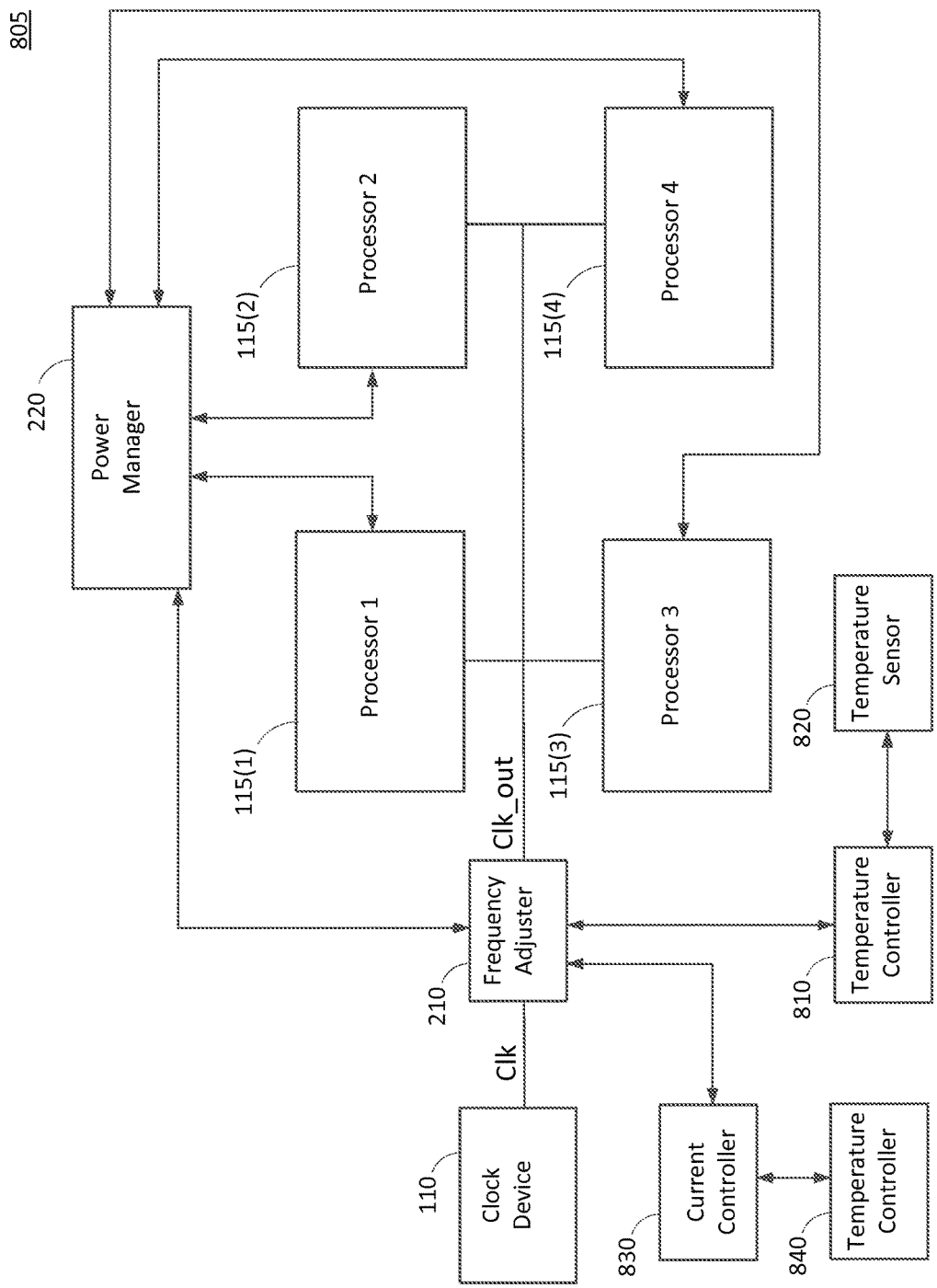
FIG. 8 shows an example of a temperature controller and a current controller according to an embodiment of the present disclosure.

In the above examples, the frequency adjuster 210 is used to reduce the frequency of the clock signal Clk_out prior to activation of one or more of the processors 115(1)-115(4). However, it is to be appreciated that the frequency adjuster 210 may be also be used to reduce the frequency of the clock signal Clk_out in other applications. For example, a temperature controller may use the frequency adjuster 210 to reduce the frequency of the clock signal Clk_out during temperature mitigation. In this regard, FIG. 8 shows an example of the processing system 805, in which a temperature controller 810 monitors the temperature of a chip on which the processor system 805 resides using one or more on-chip temperature sensors 820. If the monitored temperature rises above a thermal threshold, the temperature controller 810 may instruct the frequency adjuster 210 to reduce the frequency of the clock signal Clk_out to reduce the temperature. The reduced frequency reduces the temperature by reducing the dynamic power dissipation of the active processors.

In another example, a current controller 830 may use the frequency adjuster 210 to prevent the current on the PDN from exceeding a current limit. In this example, the current controller 830 may monitor the current on the PDN using one or more on-chip current sensors 840. If the monitored current exceeds the current limit, the current controller 830 may instruct the frequency adjuster 210 to reduce the frequency of the clock signal Clk_out to reduce the current. The reduced frequency reduces the current by reducing the current load of the active processors.

Thus, when one or more processors are to be activated, the frequency of the clock signal Clk_out may already be at a frequency that is lower than the frequency of the clock signal Clk (e.g., due to temperature mitigation). In this case, the power manager 220 may take into account the current frequency of the clock signal Clk_out in determining how much to reduce the frequency of the clock signal Clk_out.

In this regard, the power manager 220 may include a table in memory listing different scenarios, where each scenario corresponds to one or more processors that are to be activated, one or more other processors that are already in the active mode, and/or a current frequency of the clock signal Clk_out. For each scenario, the table may indicate a corresponding reduced frequency, ramp down sequence, ramp up sequence, and/or wait time.

In this example, when one or more processors are to be activated, the power manager 220 may determine which scenario in the table applies based on the one or more processors to be activated, one or more other processors that are already in the active mode, and/or the current frequency the clock signal Clk_out. The current clock frequency (which may be lower than the frequency of the clock signal Clk) may be referred to as the "initial frequency" since the current frequency is the frequency before the one or more processors are activated.

After determining the applicable scenario, the power manager 220 may look up the corresponding reduced frequency, ramp down sequence, ramp up sequence and/or wait time in the table. The power manager 220 may then instruct the frequency adjuster 210 to reduce the frequency of the clock signal Clk_out from the initial frequency to the corresponding reduced frequency. If the table includes a corresponding ramp down sequence for the scenario, then the power manager 220 may instruct the frequency adjuster 210 to ramp down the frequency of the clock signal Clk_out from the initial frequency to the corresponding reduced frequency according to the corresponding ramp down sequence. After the frequency of the clock signal Clk_out is reduced, the power manager 220 may activate the one or more processors to be activated under the scenario. The power manager 220 may then wait for the corresponding wait time before increasing the frequency of the clock signal Clk_out back to the initial clock frequency. If the table includes a corresponding ramp up sequence for the scenario, then the power manager 220 may instruct the frequency adjuster 210 to ramp up the frequency of the clock signal Clk_out back to the initial clock frequency according to the corresponding ramp up sequence.

The table may be generated empirically using the techniques discussed above. More particularly, for each scenario, a reduced frequency, a ramp down sequence, a ramp up sequence, and/or a wait time that keep the voltage of the PDN within the droop limit and/or overshoot limit may be determined using the techniques discussed above.

Instead of returning to the initial clock frequency after the one or more processors are activated, the power manager 220 may instruct the frequency adjuster 210 to increase the frequency of the clock signal Clk_out from the reduced frequency to a frequency between the reduced frequency and the initial clock frequency. This may be done, for example, if the initial clock frequency is lower than the full clock frequency because of temperature mitigation by the temperature controller 810. This is because activation of the one or more processors causes the one or more processors to contribute to the total dynamic power dissipation of the processing system, which may increase temperature. Increasing the frequency of the clock signal Clk_out from the reduced frequency to a frequency that is lower than the initial frequency may compensate for the added dynamic power dissipation from the one or more processors. Alternatively, the power manager 220 may instruct the frequency adjuster 210 to increase the frequency of the clock signal Clk_out back to the initial frequency, and rely on the temperature controller 810 to readjust the frequency of the clock signal Clk_out based on any increase in temperature resulting from activation of the one or more processors.

Figure 9:
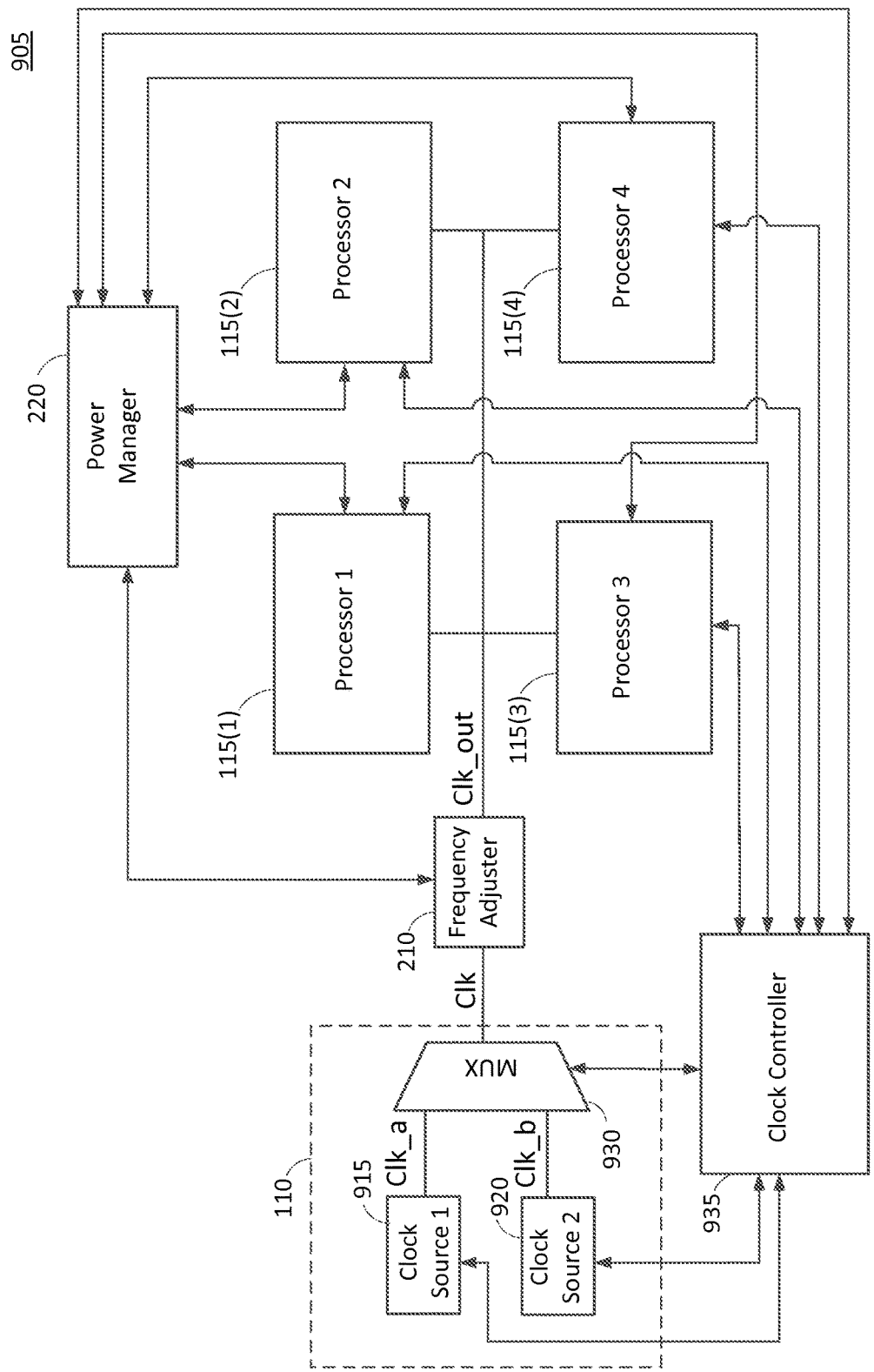
FIG. 9 shows an example of a clock device comprising a plurality of clock sources according to an embodiment of the present disclosure.

In one embodiment, the clock device 110 may be configured to output one of a plurality of different clock frequencies depending on a desired processing speed for one or more of the processors 115(1) to 115(4). In this regard, FIG. 9 shows an example of the processing system 905 in which the clock device 110 comprises a first clock source 915, a second clock source 920, and a multiplexer 930. Each of the clock sources 915 and 920 may comprise a phase-locked loop (PLL) or another type of circuit. The first clock source 915 provides a first input clock signal (denoted "Clk_a") to the multiplexer 930, and the second clock source 920 provides a second input clock signal (denoted "Clk_b") to the multiplexer 930, in which the first input clock signal Clk_a has a higher frequency than the second input clock signal Clk_b. Although, the clock device 110 in the example in FIG. 9 comprises two clock sources, it is to be appreciated that the clock device 110 may comprise more than two clock sources.

The multiplexer 930 is configured to receive the input clock signals Clk_a and Clk_b, and to selectively output one of the input clock signals Clk_a and Clk_b under the control of a clock controller 935. The selected one of the input clock signals Clk_a and Clk_b provides the output clock signal Clk of the clock device 110.

The clock controller 935 may be configured to dynamically change the frequency of the clock signal Clk depending on use cases by controlling which one of the input clock signals Clk_a and Clk_b is selected by the multiplexer 930. For example, if one or more of the processors 115(1)-115(4) are running one or more applications requiring high processing speeds, the clock controller 935 may instruct the multiplexer 930 to select the first input clock signal Clk_a. In this case, the clock signal Clk is sourced by the first input clock signal Clk_a, and therefore has the frequency of the first input clock signal Clk_a. In another example, if one or more of the processors 115(1)-115(4) are running one or more applications that do not require high processing speeds, the clock controller 935 may instruct the multiplexer 930 to select the second input clock signal Clk_b to conserve power. In this case, the clock signal Clk is sourced by the second input clock signal Clk_b, and therefore has the frequency of the second clock signal Clk_b, which is lower than the frequency of the first input clock signal Clk_a.

In one aspect, each of the processors 115(1)-115(4) may be configured to send a request to the clock controller 935 to change the frequency of the clock signal Clk based on the processing needs of the processor. For example, a processor may send a request to the clock controller 935 to increase the frequency of the clock signal Clk if the processor is running a computationally-intensive application. In response to the request, the clock controller 935 may instruct the multiplexer 930 to select the first input clock signal Clk_a if the second input clock signal Clk_b is currently selected. In another example, the clock controller 935 may select the second input clock signal Clk_b unless one or more of the processors request a higher clock frequency.

The power manager 220 may also instruct the clock controller 935 which of the input clock signals Clk_a to Clk_b to select. For example, the power manager 220 may instruct the clock controller 935 to select the second input clock signal Clk_b if a battery powering the processing system 905 is running low to conserve power. In this case, the instruction from the power manager 220 may override a request from a processor to increase the clock frequency. In one aspect, the clock controller 935 may inform the power manager 220 which one of the input clock signals Clk_a and Clk_b is currently selected, as discussed further below.

As discussed above, when one or more processors are to be activated, the power manager 220 may take into account the current frequency of the clock signal Clk_out in determining how much to reduce the frequency of the clock signal Clk_out. In this embodiment, the current frequency of the clock signal Clk_out depends at least in part on which one of the input clock signals Clk_a and Clk_b is selected by the multiplexer 930. Thus, the scenarios in the table used by the power manger 220 may include scenarios corresponding to each of the input clock signals Clk_a and Clk_b.

In this example, when one or more processors are to be activated, the power manager 220 may determine which scenario in the table applies based on the one or more processors to be activated, one or more other processors that are already in the active mode, and/or the current frequency of the clock signal Clk_out. The current clock frequency depends at least in part on which one of the input clock signals Clk_a and Clk_b is currently selected. As discussed above, the current frequency may be referred to as the "initial frequency" since the current frequency is the frequency before the one or more processors are activated.

After determining the applicable scenario, the power manager 220 may look up the corresponding reduced frequency, ramp down sequence, ramp up sequence and/or wait time in the table. The power manager 220 may then instruct the frequency adjuster 210 to reduce the frequency of the clock signal Clk_out from the initial frequency to the corresponding reduced frequency. If the table includes a corresponding ramp down sequence for the scenario, then the power manager 220 may instruct the frequency adjuster 210 to ramp down the frequency of the clock signal Clk_out from the initial frequency to the corresponding reduced frequency according to the corresponding ramp down sequence. After the frequency of the clock signal Clk_out is reduced, the power manager 220 may activate the one or more processors to be activated under the scenario. The power manager 220 may then wait for the corresponding wait time before increasing the frequency of the clock signal Clk_out to back to the initial frequency. If the table includes a corresponding ramp up sequence for the scenario, then the power manager 220 may instruct the frequency adjuster 210 to ramp up the frequency of the clock signal Clk_out back to the initial frequency according to the corresponding ramp up sequence.

The table may be generated empirically using the techniques discussed above. More particularly, for each scenario, a reduced frequency, a ramp down sequence, a ramp up sequence, and/or a wait time that keep the voltage of the PDN within the droop limit and/or overshoot limit may be determined using the techniques discussed above.

In one embodiment, the power manager 220 may be configured to disable the clock signal Clk when all of the processors 115(1)-115(4) are in the idle mode to conserve power. For example, the power manager 220 may disable the clock signal Clk by shutting off the clock sources 915 and 920 (e.g., PLLs) in the clock device 110. In this example, the clock controller 935 may be configured to shut off the clock sources 915 and 920 under the control of the power manager 220. In another example, the power manager 220 may disable the clock signal Clk by disabling the multiplexer 930.

In this embodiment, when one or more processors are to be activated and all of the processors 115(1)-115(4) are initially in the idle mode, the power manager 220 may first enable the clock signal Clk. For example, the power manager 220 may instruct the clock controller 935 to turn on the clock sources 915 and 920 and/or enable the multiplexer 930. The power manager 220 may also instruct the clock controller 935 which one of the input clock signals Clk_a and Clk_b to select to source the clock signal Clk. For example, the power manager 220 may instruct the clock controller 935 to initially select the second input clock signal Clk_b. In another example, the power manager 220 may instruct the clock controller 935 to select the input clock signal that was last selected before all of the processors 115(1)-115(4) were placed in the idle mode.

When the clock signal Clk is enabled, the power manager 220 may instruct the frequency adjuster 210 to output the clock signal Clk_out at a desired reduced frequency (i.e., frequency lower than the frequency of the clock signal Clk). The reduced frequency reduces voltage droop on the PDN when the one or more processors are activated, as discussed further below. While the frequency of the clock signal Clk_out is at the reduced frequency, the power manager 220 may activate the one or more processors (e.g., by un-gating internal clock paths of the one or more processors). The power manager 220 may then wait for a wait period, and increase the frequency of the clock signal Clk_out to full clock frequency after the wait period has elapsed. In one aspect, the power manager 220 may ramp up the frequency of the clock signal from the reduced frequency to the full clock frequency.

Thus, the one or more processors are activated at the reduced clock frequency instead of full clock frequency (i.e., frequency of clock signal Clk). The reduced frequency reduces the rate in change in the current load on the PDN when the one or more processors are activated, thereby reducing the voltage droop on the PDN.

As discussed above, the power manager 220 may include a table in memory listing different scenarios. The scenarios in the table may include a plurality of scenarios in which all of the processors 115(1)-115(4) are initially in the idle mode. Each of these scenarios may correspond to one or more processors that are to be activated, and/or a frequency of the clock signal Clk (e.g., selected one of the input clock signals Clk_a and Clk_b). For each of these scenarios, the table may indicate a corresponding reduced frequency, ramp up sequence, and/or wait time for the clock signal Clk_out.

In this example, when one or more processors are to be activated and all of the processors 115(1)-115(4) are initially in the idle mode, the power manager 220 may determine which of the plurality of scenarios in the table applies based on the one or more processors to be activated, and/or the frequency of the clock signal Clk (e.g., frequency of the selected one of the input clock signals Clk_a and Clk_b). After determining the applicable scenario, the power manager 220 may look up the corresponding reduced frequency, ramp up sequence and/or wait time in the table. The power manager 220 may then enable the clock signal Clk and instruct the frequency adjuster 210 to output the clock signal Clk_out with a frequency at the corresponding reduced frequency. The power manager 220 may then activate the one or more processors to be activated under the scenario, and wait for the corresponding wait time before increasing the frequency of the clock signal Clk_out to full clock frequency (i.e., frequency of the clock signal Clk). If the table includes a corresponding ramp up sequence for the scenario, then the power manager 220 may instruct the frequency adjuster 210 to ramp up the frequency of the clock signal Clk_out to full clock frequency according to the corresponding ramp up sequence.

The table may be generated empirically using the techniques discussed above. More particularly, for each scenario, a reduced frequency, a ramp up sequence, and/or a wait time that keep the voltage of the PDN within the droop limit and/or overshoot limit may be determined using the techniques discussed above.

Figure 10:
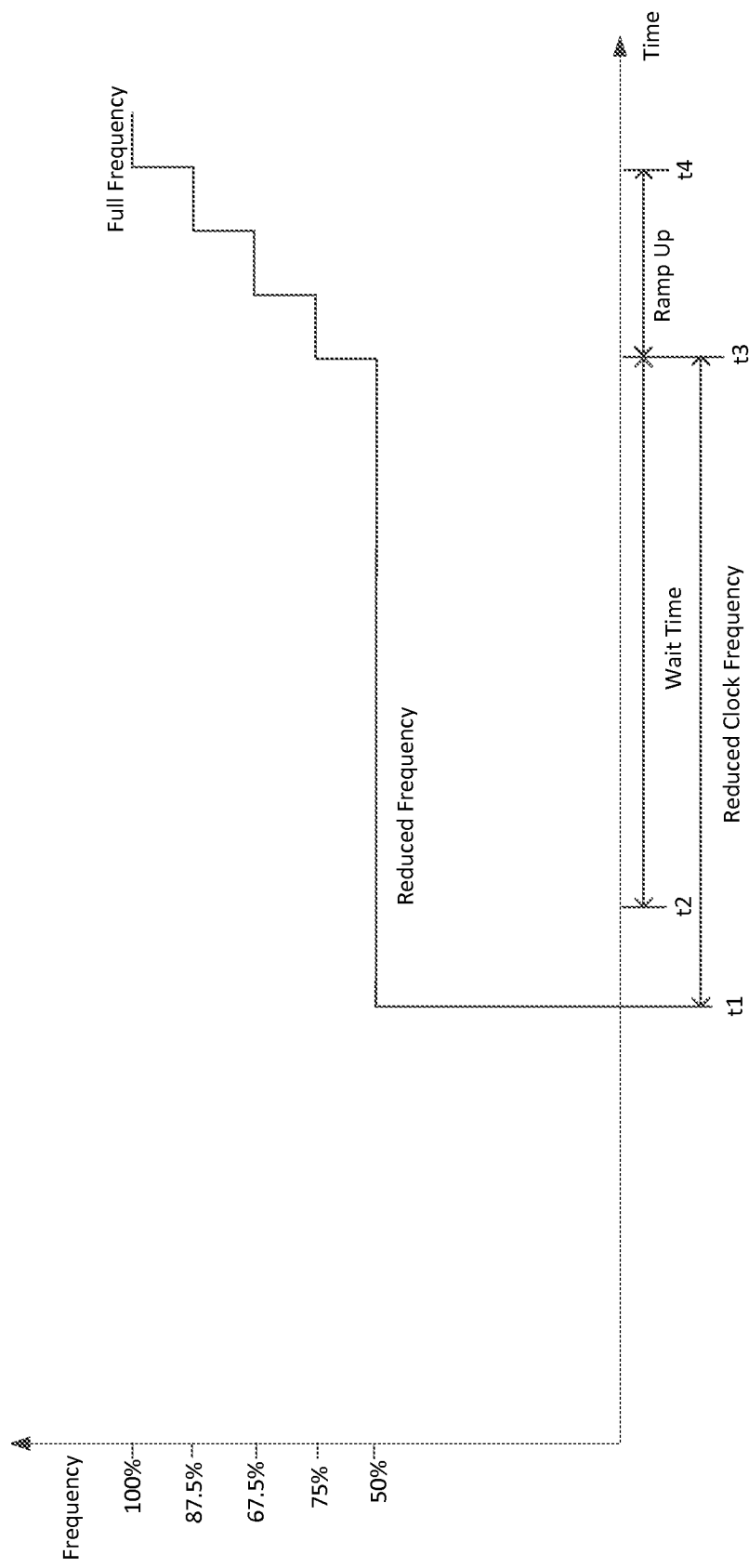
FIG. 10 shows an exemplary timeline in which one or more processors are activated according to an embodiment of the present disclosure.

FIG. 10 shows the frequency of the clock signal Clk_out as a percentage of full clock frequency over time for an example in which one or more processors are activated (e.g., in response to an interrupt signal or event) and all of the processors are initially in the idle mode. At time t1, the power manager 220 enables the clock signal Clk, and the frequency adjuster 210 outputs the clock signal Clk_out at a reduced frequency equal to 50% of the full clock frequency. At this time, all of the processor may be in the idle mode. The power manager 220 then un-gates internal clock paths of the one or more processors to active the one or more processors at time t2. After a wait period (labeled "Wait Time" in FIG. 10), the power manager 220 instructs the frequency adjuster 210 to ramp up the frequency of the clock signal Clk_out to full clock frequency at time t4. At time t5, the frequency of the clock signal Clk_out reaches full frequency. It is to be appreciated that other reduced frequencies may be used besides 50% of the full clock frequency, and therefore that the present disclosure is not limited to the example of 50% of the full clock frequency. Further, although not shown in FIG. 10, it is to be appreciated that the clock signal Clk_out may be ramped up from approximately zero hertz to the reduced frequency when the clock signal Clk is enabled.

Figure 11:
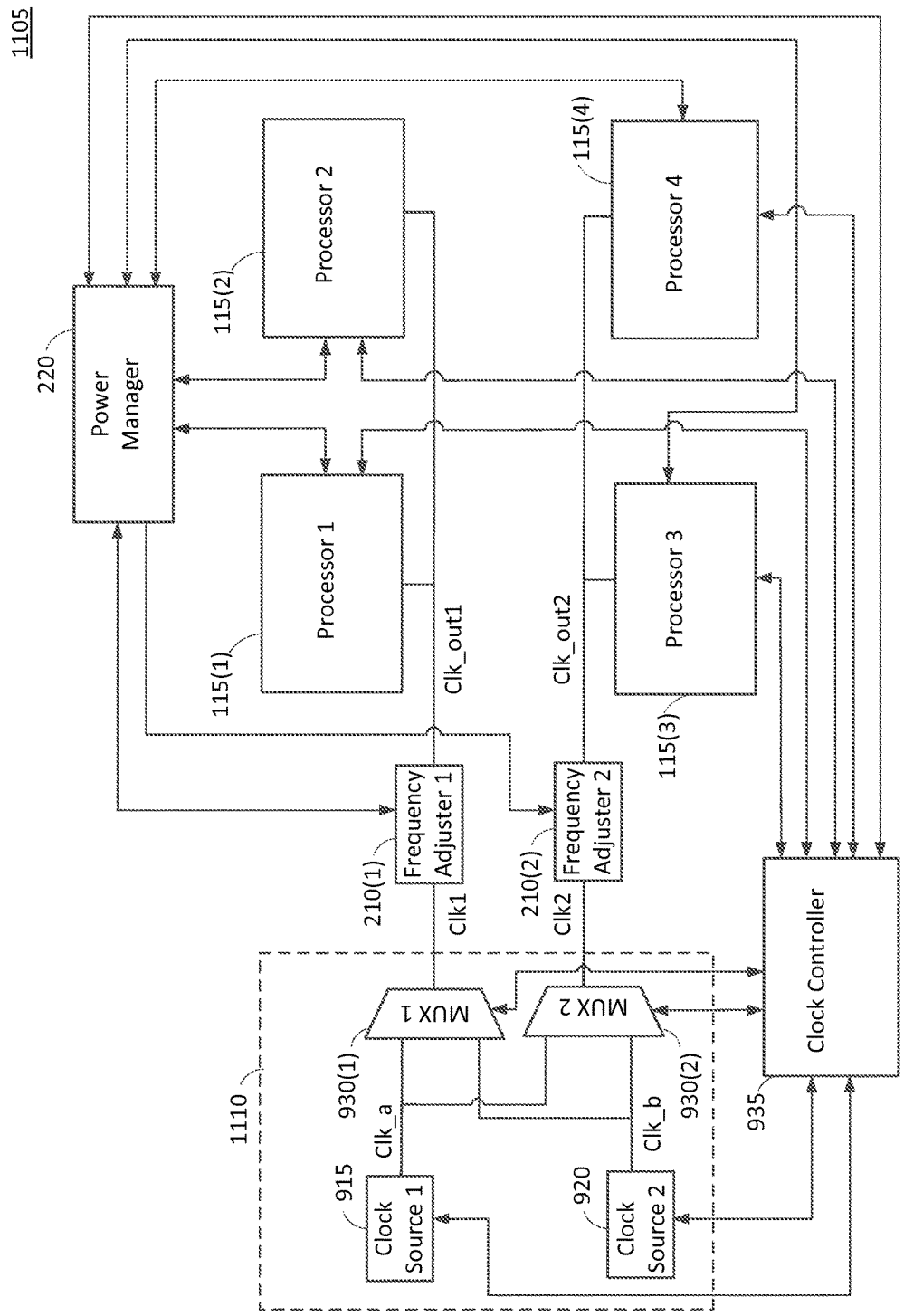
FIG. 11 shows an example of a clock device capable of outputting a plurality of clock signals according to an embodiment of the present disclosure.

In one embodiment, the clock device may output more than one clock signal to the processors 115(1)-115(4). In this regard, FIG. 11 shows an example of the processing system 1105 in which the clock device 1110 outputs a first clock signal (denoted "Clk1") to the first and second processors 115(1) and 115(2), and a second clock signal (denoted "Clk2") to the third and fourth processors 115(3) and 115(4). This allows the first and second processors 115(1) and 115(2) to operate at a different clock speed than the third and fourth processors 115(3) and 115(4), as discussed further below.

In this example, the clock device 1110 comprises a first multiplexer 930(1) and a second multiplexer 930(2). The first multiplexer 930(1) is configured to receive the input clock signals Clk_a and Clk_b from the first and second clock sources 915 and 920, respectively, and to selectively output one of the input clock signals Clk_a and Clk_b to the first and second processors 115(1) and 115(2) under the control of the clock controller 935. The second multiplexer 930(2) is configured to receive the input clock signals Clk_a and Clk_b from the first and second clock sources 915 and 920, respectively, and to selectively output one of the input clock signals Clk_a and Clk_b to the third and fourth processors 115(3) and 115(4) under the control of the clock controller 935. This arrangement allows the processors 115(1)-115(4) to receive the same one of the input clock signals Clk_a and Clk_b or the first and second processors 115(1) and 115(2) to receive a different one of the input clock signals Clk_a and Clk_b than the third and fourth processors 115(3) and 115(4) depending on the selections of the first and second multiplexers 930(1) and 930(2).

The clock controller 935 may be configured to dynamically change the frequency of each of the first and second output clock signals Clk1 and Clk2 by controlling which one of the input clock signals Clk_a and Clk_b is selected by the respective multiplexer. For example, if one or both of the first and second processors 115(1) and 115(2) require a high processing speed (e.g., one or both of the first and second processors 115(1) and 115(2) request a high clock speed), the clock controller 935 may instruct the first multiplexer

930(1) to select the first input clock signal Clk_a. In this case, the first output clock signal Clk1 is sourced by the first input clock signal Clk_a. Similarly, if one or both of the third and fourth processors 115(2) and 115(3) require a high processing speed (e.g., one or both of the third and fourth processors 115(3) and 115(4) request a high clock speed), the clock controller 935 may instruct the second multiplexer 930(2) to select the first input clock signal Clk_a. In this case, the second output clock signal Clk2 is sourced by the first input clock signal Clk_a.

In another example, if one or both of the first and second processors 115(1) and 115(2) do not require a high processing speed, the clock controller 935 may instruct the first multiplexer 930(1) to select the second input clock signal Clk_b to conserve power. In this case, the first output clock signal Clk1 is sourced by the second input clock signal Clk_b, which has a lower frequency than the first input clock signal Clk_a. Similarly, if one or both of the third and fourth processors 115(3) and 115(4) do not require high processing speeds, the clock controller 935 may instruct the second multiplexer 930(2) to select the second input clock signal Clk_b to conserve power. In this case, the second output clock signal Clk2 is sourced by the second input clock signal Clk_b.

In the example in FIG. 11, the processing system 1105 comprises a first frequency adjuster 210(1) and a second frequency adjuster 210(2). The first frequency adjuster 210(1) is configured to reduce the frequency of the first clock signal Clk1 by an adjustable amount under the control of the power manager 220, and output the resulting clock signal (denoted "Clk_out1") to the first and second processors 115(1) and 115(2). The second frequency adjuster 210(2) is configured to reduce the frequency of the second clock signal Clk2 by an adjustable amount under the control of the power manager 220, and output the resulting clock signal (denoted "Clk_out2") to the third and fourth processors 115(3) and 115(4). This allows the power manager 220 to independently adjust the frequencies of the first and second output clock signals Clk_out1 and Clk_out2.

In this example, the power manager 220 may active one or more of the processors 115(1)-115(4) under various scenarios. For instance, in one exemplary scenario, the power manager 220 may active the first processor 115(1) and/or the second processor 115(2) while one or more of the other processors are already in the active mode. In this scenario, the power manager 220 may reduce the frequency of the first output clock signal Clk_out1 before activating the first and/or second processors. In another exemplary scenario, the power manager 220 may active the third processor 115(3) and/or the fourth processor 115(4) while one or more of the other processors are already in the active mode. In this scenario, the power manager 220 may reduce the frequency of the second output clock signal Clk_out2 before activating the third and/or fourth processors. In yet another exemplary scenario, the power manager 220 may active the first processor 115(1) and the third processor 115(3) while one or both of the second processor and the fourth processor are already in the active mode. In this scenario, the power manager 220 may reduce the frequency of the first output clock signal Clk_out1 and the frequency of the second output clock signal Clk_out2 before activating the first and third processors.

In order to activate one or more of the processors 115(1)-115(4) under different scenarios, the power manager 220 may include a table in memory listing the different scenarios. Each of these scenarios may correspond to one or more of the processors to be activated, one or more other ones of the processors that are already in the active mode, a frequency of the first output clock Clk_out1 and/or a frequency of the second output clock Clk_out2. For each of these scenarios, the table may include a set of parameters (e.g., a corresponding reduced frequency, ramp down sequence, ramp up sequence, and/or wait time) for the first output clock signal Clk_out1, and/or a set of parameters (e.g., corresponding reduced frequency, ramp down sequence, ramp up sequence, and/or wait time) for the second output clock signal Clk_out2.

For some scenarios (e.g., a scenario in which only one of the processors is to be activated), the table may only include a set of parameters for one of the first and second output clock signals Clk_out1 and Clk_out2. In these scenarios, the power manager 220 may leave the other one of the output clock signals alone. For other scenarios (e.g., a scenario in which the first and third processors are to be activated), the table may include a set of parameters for each of the first and second output clock signals Clk_out1 and Clk_out2.

When one or more processors are to be activated, the power manager 220 may determine which of the plurality of scenarios in the table applies based on the one or more processors to be activated, one or more other ones of the processors that are already in the active mode, the current frequency of the first output clock signal Clk_out1 and/or the current frequency of the second output clock signal Clk_out2. After determining the applicable scenario, the power manager 220 may look up the set of parameters (e.g., corresponding reduced frequency, ramp down sequence ramp up sequence and/or wait time) in the table for the first output clock signal Clk_out1, and/or the set of parameters (e.g., corresponding reduced frequency, ramp down sequence ramp up sequence and/or wait time) in the table for the second output clock signal Clk_out2.

The power manager 220 may then reduce the frequency of the first output clock signal Clk_out1 to the corresponding reduced frequency and/or reduce the frequency of the second output clock signal Clk_out2 to the corresponding reduced frequency. If the frequencies of both of the output clock signals Clk_out1 and Clk_out2 are ramped down, the frequency ramp downs may overlap in time. Alternatively, the power manager 220 may ramp down the frequency of one of the output clock signals before ramping down the frequency of the other one of the output clock signals.

After the frequency of the first output clock signal Clk_out1 and/or the frequency of the second output clock signal Clk_out2 are reduced, the power manager 220 may activate the one or more processors to be activated under the scenario. The power manager 220 may then increase the frequency of the first output clock signal Clk_out1 after the corresponding wait time, and/or increase the frequency of the second output clock signal Clk_out2 after the corresponding wait time. If the frequencies of both of the output clock signals Clk_out1 and Clk_out2 are ramped up, the frequency ramp ups may overlap in time. Alternatively, the power manager 220 may ramp up the frequency of one of the output clock signals before ramping up the frequency of the other one of the output clock signals. In this case, the wait times for the first and second output clock signals may be different.

The table in this example may be generated empirically using the techniques discussed above. More particularly, for each of the different scenarios, a set of parameters may be determined for the first output clock signal Clk_out1 and/or a set of parameters may be determined for the second output clock signal Clk_out2 that keep the voltage on the PDN within the overshoot limit and/or droop limit discussed above.

Although embodiments of the present disclosure are described above using the example of a processing system comprising four processors, it is to be appreciated that embodiments of the present disclosure are not limited to this example. For instance, embodiments of the present disclosure may be used in a processing system comprising two processors, a processing system comprising eight processors, etc.

Figure 12:
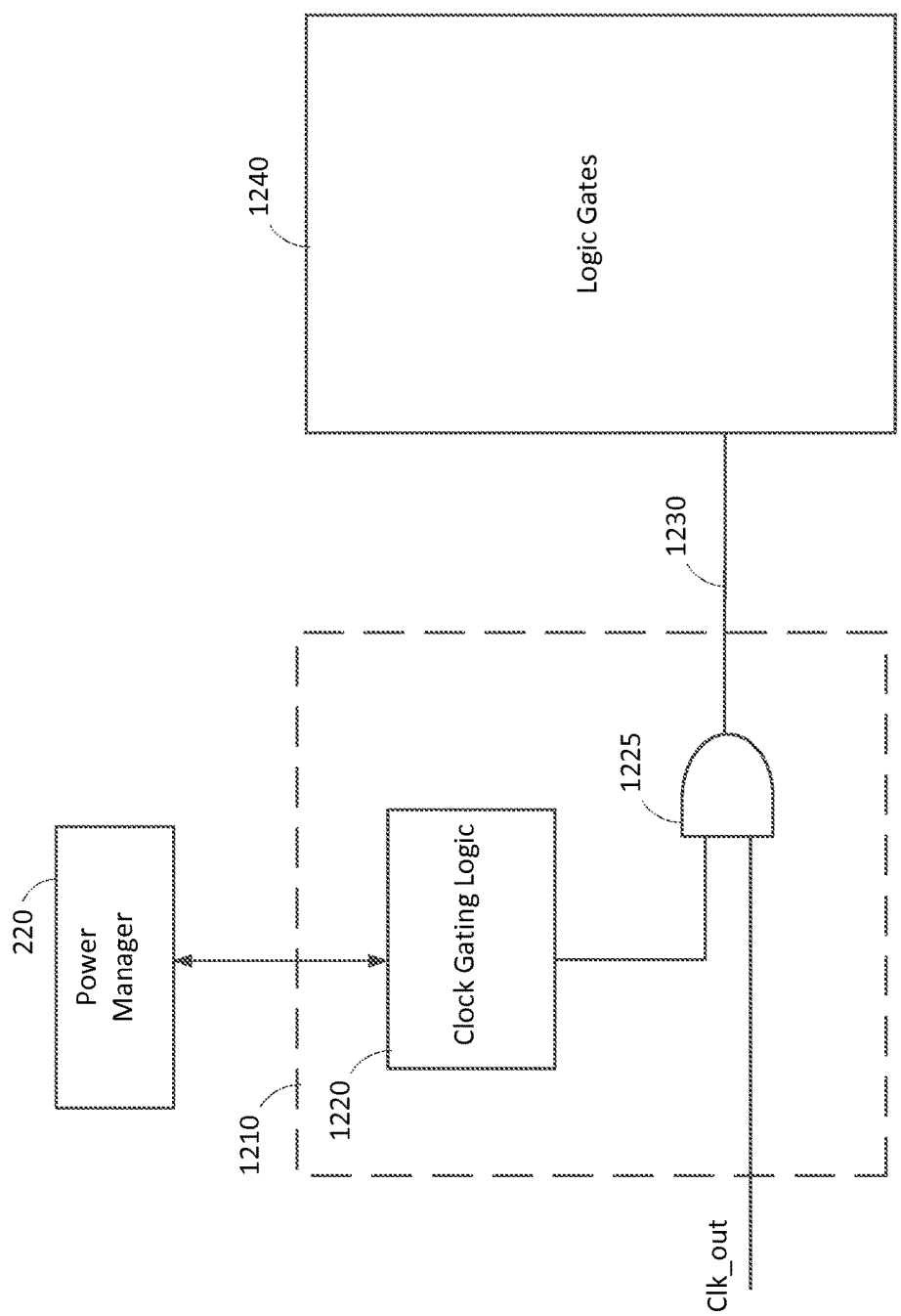
FIG. 12 shows an exemplary clock gating circuit according to an embodiment of the present disclosure.

FIG. 12 shows an exemplary clock gating circuit 1210 according to an embodiment of the present disclosure. Each of the processors 115(1)-115(4) may include the clock gating circuit 1210 to selectively gate the clock signal Clk_out received by the processor. The clock-gating circuit 1210 comprises clock gating logic 1220 and a clock gate 1225. The clock gating logic 1220 is configured to enable or disable the clock gate 1225 under the control of the power manager 220, as discussed further below.

In the example in FIG. 12, the clock gate 1225 comprises an AND gate having a first input coupled to the clock signal Clk_out, a second input coupled to the clock gating logic 1220, and a clock output 1230 coupled to logic gates of the respective processor. The clock output 1230 may branch off into a plurality of clock paths (not shown) to provide the clock signal to various gates of the logic gates 1240. The logic gates 1240 may be configured to fetch, decode and execute instructions and/or perform other operations using the clock signal Clk_out. In this example, the clock gate 1225 is disabled (i.e., blocks the clock signal Clk_out) when the clock gating circuit 1220 outputs a logic zero to the clock gate 1225, and is enabled (i.e., allows the clock signal Clk_out to pass) when the clock gating circuit 1220 outputs a logic one to the clock gate 1225.

The clock gating logic 1220 may be configured to disable the clock gate 1225 (i.e., gate the clock signal Clk_out) upon receiving a signal from the power manager 220 to enter the idle mode. The clock gating logic 1220 may verify that the logic gates have completed one or more outstanding instructions before disabling the clock gate 1225. The clock gating logic 1220 may also be configured to enable the clock gate 1225 upon receiving a signal from the power manager 220 to exit the idle mode (e.g., transition to the active mode). The clock gating logic 1220 may be clocked by the clock signal Clk_out or another clock signal (not shown).

Figure 13:
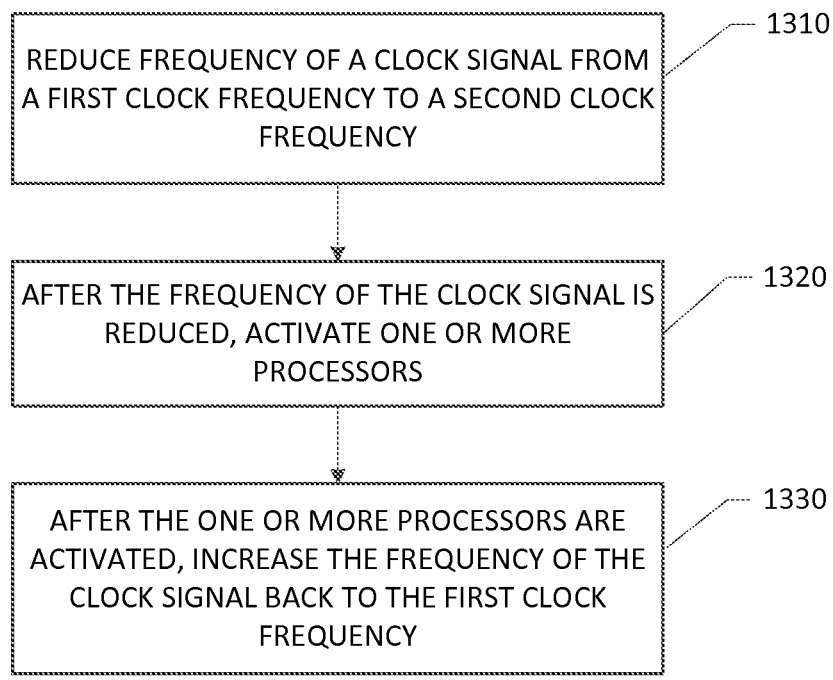
FIG. 13 is a flow diagram illustrating a method for activating one or more processors according to an embodiment of the present disclosure

FIG. 13 is a flow diagram illustrating a method 1300 for activating one or more processors according to an embodiment of the present disclosure. The one or more processors may be one or more of a plurality of processors (e.g., processors 115(1)-115(4)) of a multicore processing system. In this example, the one or more processors may be activated while one or more other processors of the multicore processing system are already in the active mode.

In step 1310, a frequency of a clock signal is reduced from a first clock frequency to a second clock frequency. For example, the clock signal (e.g., clock signal Clk_out) may be provided to the processors of the multicore processing system. In one example, the frequency reduction may be performed by a frequency adjuster (e.g., frequency adjuster 210) that receives an input clock signal (e.g., clock signal Clk) and outputs the clock signal (e.g., clock signal Clk_out) to the processors. In this example, the frequency adjuster may reduce the frequency of the clock signal (e.g., clock signal Clk_out) by swallowing pulses and/or dividing the frequency of the input clock signal (e.g., clock signal Clk). Also, in this example, the first clock frequency may be approximately equal to the frequency of the input clock signal (e.g., clock signal Clk), and the second clock frequency may be lower than the frequency of the input clock signal.

In step 1320, after the frequency of the clock signal is reduced, the one or more processors are activated. This may be done by un-gating internal clock paths in the one or more processors to enable the clock signal to propagate to logic gates in the one or more processors, causing the logic gates to start switching.

In step 1330, after activation of the one or more processors, the frequency of the clock signal is increased back to the first clock frequency. For example, the first clock frequency may be approximately equal to the frequency of the input clock signal (e.g., clock signal Clk) discussed above.

Although embodiments of the present disclosure are described above using the example in which one or more processors transition from the idle mode to the active mode, it is to be appreciated that embodiments of the present disclosure may also be used when one or more processors transition from the active mode to the idle mode. In this case, the frequency of the clock signal Clk_out may be reduced prior to transiting the one or more processors from the active mode to the idle mode to reduce voltage overshoot on the PDN. The reduced frequency reduces overshoot by reducing the rate at which the current load decreases when the one or more processors transition to the idle mode. After the one or more processors are in the idle mode, the frequency of the clock signal Clk_out may be increased back to full clock frequency.

It is to be appreciated that the clock controller and power manager according to any of the embodiments discussed above may be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may perform the functions of the delay controller described herein by executing software comprising code for performing the functions. The software may be stored on a computer-readable storage medium, such as a RAM, a ROM, an EEPROM, an optical disk, and/or a magnetic disk.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A processing system, comprising:
   a plurality of processors;
   a clock device configured to generate an input clock signal;
   a frequency adjuster configured to receive the input clock signal from the clock device, and to output an output clock signal to the plurality of processors based on the input clock signal; and a power manager configured to receive a signal to activate one or more of the processors that are in an idle mode while one or more other ones of the processors are in an active mode, wherein, in response to the signal, the power manager is configured to instruct the frequency adjuster to reduce a frequency of the output clock signal from a first clock frequency to a second clock frequency, to activate the one or more of the processors that are in the idle mode while the frequency of the output clock signal is at the second clock frequency, and to instruct the frequency adjuster to increase the frequency of the output clock signal from the second clock frequency to the first clock frequency after the one or more of the processors are activated, wherein the second clock frequency is between 20% to 80% of the first clock frequency.

2. The processing system of claim 1, wherein the first clock frequency is approximately equal to a frequency of the input clock signal.

3. The processing system of claim 1, wherein the power manager activates the one or more of the processors by un-gating internal clock paths in the one or more of the processors.

4. The processing system of claim 1, wherein the frequency adjuster is configured to reduce the frequency of the output clock signal by selectively swallowing pulses of the input clock signal.

5. The processing system of claim 1, wherein the frequency adjuster is configured to reduce the frequency of the output clock signal by dividing a frequency of the input clock signal.

6. The processing system of claim 1, wherein the signal to activate the one or more of the processors comprises an interrupt signal.

7. The processing system of claim 6, wherein the power manager is configured to place the one or more of the processors in the idle mode in response to execution of a wait-for-interrupt (WFI) instruction, and the interrupt signal is received after the one or more of the processors are placed in the idle mode.

8. The processing system of claim 1, wherein the power manager is configured to determine the second clock frequency based on the one or more of the processors to be activated in response to the signal, and the one or more other ones of the processors that are in the active mode at a time the signal is received.

9. The processing system of claim 8, wherein the power manager is further configured to determine the second clock frequency based on the first clock frequency.

10. A method for activating one or more processors in a plurality of processors, comprising:
receiving a signal to activate the one or more processors that are in an idle mode while one or more other ones of the plurality of processors are in an active mode;
reducing, in response to the signal, a frequency of a clock signal from a first clock frequency to a second clock frequency, wherein the clock signal is output to the plurality of processors including the one or more processors that are in the idle mode and the one or more other ones of the processors that are in the active mode, and the second clock frequency is between 20% to 80% of the first clock frequency;
activating, in response to the signal, the one or more processors that are in the idle mode after the frequency of the clock signal is reduced; and
increasing the frequency of the clock signal from the second clock frequency to the first clock frequency after the one or more processors are activated.

11. The method of claim 10, wherein activating the one or more processors comprises un-gating internal clock paths in the one or more processors.

12. The method of claim 10, further comprising:
placing the one or more processors in the idle mode in response to execution of a wait-for-interrupt (WFI) instruction, wherein the signal is an interrupt signal.

13. The method of claim 10, further comprising determining the second clock frequency based on the one or more processors, and the one or more other ones of the plurality of processors that are already in the active mode at a time the determination is made.

14. The method of claim 13, wherein determining the second clock frequency further comprises determining the second clock frequency based on the first clock frequency.

15. An apparatus for activating one or more processors in a plurality of processors, comprising:
means for receiving a signal to activate the one or more processors that are in an idle mode while one or more other ones of the plurality of processors are in an active mode;
means for reducing, in response to the signal, a frequency of a clock signal from a first clock frequency to a second clock frequency, wherein the clock signal is output to the plurality of processors including the one or more processors that are in the idle mode and the one or more other ones of the processors that are in the active mode, and the second clock frequency is between 20% to 80% of the first clock frequency;
means for activating, in response to the signal, the one or more processors that are in the idle mode after the frequency of the clock signal is reduced; and
means for increasing the frequency of the clock signal from the second clock frequency to the first clock frequency after the one or more processors are activated.

16. The apparatus of claim 15, wherein the means for activating the one or more processors comprises means for un-gating internal clock paths in the one or more processors.

17. The apparatus of claim 15, further comprising:
means for placing the one or more processors in the idle mode in response to execution of a wait-for-interrupt (WFI) instruction, wherein the signal is an interrupt signal.

18. The apparatus of claim 15, further comprising means for determining the second clock frequency based on the one or more processors, and the one or more other ones of the plurality of processors that are already in the active mode at a time the determination is made.

19. The apparatus of claim 18, wherein the means for determining the second clock frequency further determines the second clock frequency based on the first clock frequency.

* * * * *